United States Patent [19]

Breeden et al.

[11] 3,902,022

[45] Aug. 26, 1975

[54] MULTIPLEX SYSTEM FOR PAGING TERMINALS AND METHOD

[75] Inventors: Robert L. Breeden, Pompano Beach; James H. Stangel, Ft. Lauderdale, both of Fla.

[73] Assignee: Motorola, Inc., Chicago, Ill.

[22] Filed: Sept. 19, 1973

[21] Appl. No.: 398,619

[52] U.S. Cl. .......................... 179/41 A; 179/18 BF
[51] Int. Cl.² .......................................... H04Q 7/00
[58] Field of Search ...... 179/41 A, 15 BV, 15.55 R, 179/18 BF, 18 ES

[56] References Cited

UNITED STATES PATENTS 3,575,558 4/1971 Leyburn et al. ................. 179/41 A
3,781,818 12/1973 Pardoe et al. ................. 179/15 BV

*Primary Examiner*—Kathleen H. Claffy
*Assistant Examiner*—Gerald L. Brigance
*Attorney, Agent, or Firm*—Eugene A. Parsons; James W. Gillman

[57] ABSTRACT

A plurality of remote multiplex units, each associated with a transmitter for communicating with portable pagers and having a plurality of input telephone lines connected thereto, are connected to a central terminal by a telephone line. The remote unit sequentially sends stored data from each of the telephone lines via the single telephone line to the central terminal and periodically connects the transmitter to the telephone line so that the central terminal can control the transmitter to transmit pages.

7 Claims, 3 Drawing Figures

PATENTED AUG 26 1975

3,902,022

SHEET 2 OF 2

MULTIPLEX SYSTEM FOR PAGING TERMINALS AND METHOD

BACKGROUND OF THE INVENTION

1. Field of the Invention

The present invention pertains to a paging system wherein persons to be paged carry portable pagers and the persons are paged by dialing a first number, which connects the phone to a trunk line, an answering service, or the like. The trunk line, answering service, etc. is connected by a telephone line to a terminal and, when an identifier is dialed, the terminal converts the identifier to an address which is transmitted, in a tone sequential system or the like, so that only the correct portable pager will receive the signal. Upon receiving the correct signal, the portable pager will provide a beep or other indication of signal and the person wearing the portable pager is thus made aware that someone is attempting to call him. He then simply proceeds to the nearest telephone and dials the number of the trunk line, answering service, etc. to receive the call.

2. Description of the Prior Art

In the prior art each input telephone line is directly connected to the central terminal so that 16 trunk lines, answering services, etc., require 16 lines into the central terminal. Also, if the transmitter is located remotely from the central terminal another telephone line is required from the central terminal to the transmitter. Thus, a great number of telephone lines are required in the prior art paging systems, which telephone lines greatly increase the cost of the system.

SUMMARY OF THE INVENTION

In the present system, trunk lines, answering service lines, etc. are connected to a remote multiplex unit, which unit is associated with a transmitter for the surrounding area. A single telephone line is connected between the remote unit and a central terminal, which central terminal includes a transmitter control unit. The remote unit includes switching means for sequentially sending data which has been stored as received from the various trunk lines, answering services, etc. to the single connecting line for transmission of communications to the central terminal. Periodically, the transmitter control unit at the central terminal is connected through the single connecting telephone line to the transmitter at the remote site for transmitting communications to portable pagers in the area.

It is an object of the present invention to provide an improved multiplex system for paging terminals.

It is a further object of the present invention to provide an improved paging system wherein a plurality of remote multiplex units, each associated with a transmitter, are connected to a single central terminal, including a plurality of transmitter control units, by single connecting telephone lines between each remote unit and the central terminal.

It is a further object of the present invention to provide a plurality of remote multiplex units, each associated with a transmitter, wherein communications from a plurality of telephone lines are carried to a central terminal on a single telephone line and, periodically, the single connecting telephone line is utilized to control a remote transmitter for communicating pages to portable pagers in the area.

These and other objects of this invention will become apparent to those skilled in the art upon consideration of the accompanying specification, claims and drawings.

BRIEF DESCRIPTION OF THE DRAWINGS

Referring to the drawings.

DESCRIPTION OF THE PREFERRED EMBODIMENT

Figure 1:
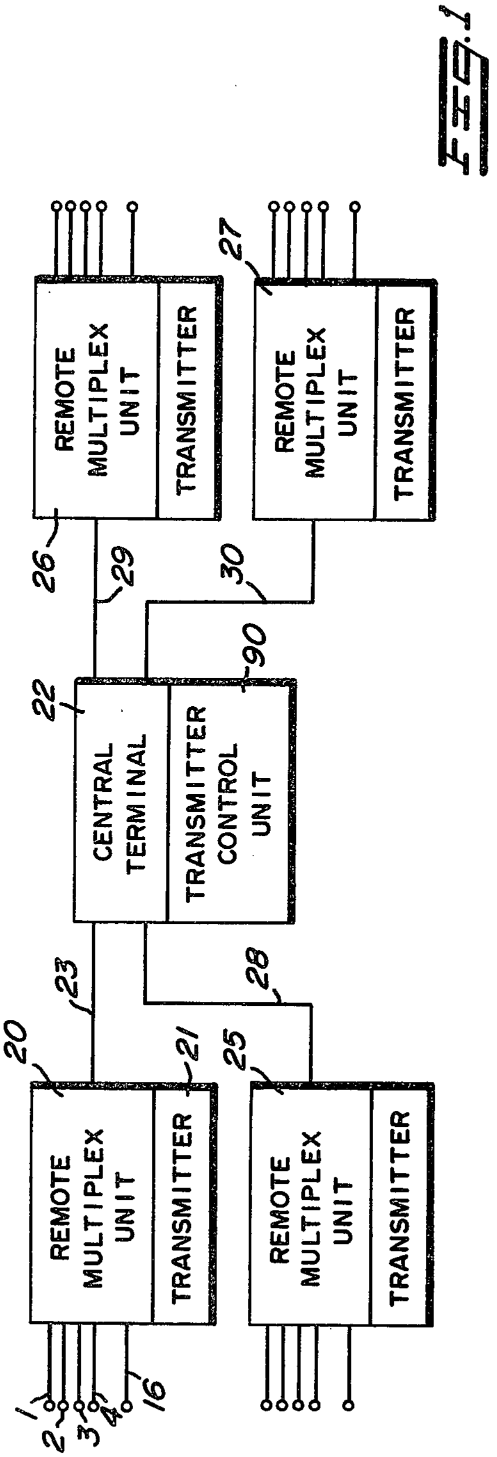
FIG. 1 is a block diagram of a multiplex system for a paging terminal incorporating an embodiment of the present invention.

Referring to FIG. 1, a remote multiplex unit 20, associated with a transmitter 21, has a plurality of input telephone lines 1, 2, 3, 4, . . . 16 attached thereto for communicating identifiers for portable pagers from 16 different inputs, such as RCC's, answering services, etc. The remote multiplex unit 20 is connected to a central terminal 22 by means of a single telephone line 23. The central terminal 22 is a standard paging terminal that may include, for example, a computer and memory, similar to that described in U.S. Pat. No. 3,575,558, which has subscriber numbers stored therein and compares incoming numbers to stored numbers whereupon a valid signal is returned if a comparison is made. It will of course be understood by those skilled in the art that the term "telephone line" is generic for a single channel in the telephone system and may actually consist of a pair of wires, an RF link, or combinations thereof. In a similar fashion, remote units 25, 26 and 27, each having transmitters and input telephone lines 1–16, are connected to the central terminal 22 by means of single telephone lines 28, 29 and 30, respectively. It should be understood that any number of remote multiplex units might be associated with a single central terminal and each of the remote units may have any convenient number of input telephone lines connected thereto.

Figure 2:
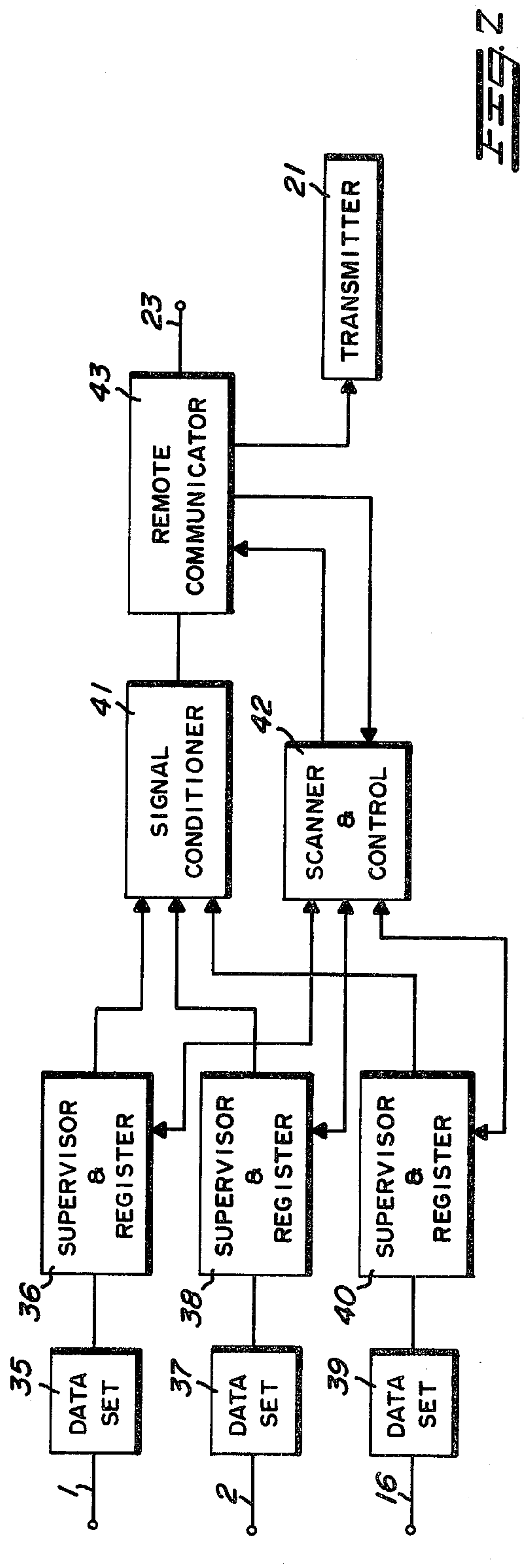
FIG. 2 is a block diagram of one remote multiplex unit illustrated in FIG. 1.

Referring to FIG. 2, the remote multiplex unit 20 is illustrated in a more specific block form. Since all of the remote multiplex units are similar, only unit 20 will be described in detail. Input telephone line 1 is connected to a data set 35 which is in turn connected to a supervisor and register circuit 36. Input telephone line 2 is connected to a data set 37 which is in turn connected to a supervisor and register circuit 38. Each of the input telephone lines is connected to a data set and a supervisor and register circuit as described, with telephone line 16 being connected to a data set 39 which is in turn connected to a supervisor and register circuit 40. The output communications from each of the supervisor and register circuits 36, 38, . . . 40 are connected to 16 inputs of a signal conditioner circuit 41. A scanner and control circuit 42 is connected to each of the supervisor and register circuits 36, 38, . . . 40 and provides instructions or signals for the sequential passage of communications from the supervisor and register circuits to the signal conditioner 41. The signal conditioner 41 translates the data into the correct code form for the central terminal and passes the data on to a remote communicator 43 which converts the communications into signals which can be transmitted over the telephone line 23 and transmits the communications or signals over the telephone line 23. The scanner and control circuit 42 is also connected to the remote communicator 43 and a transmitter 21 is connected to the remote communicator 43.

In the operation of the circuit of FIG. 2, each of the telephone lines and associated data set and supervisor and register circuits operates similarly so that only line 1, data set 35 and supervisor and register circuit 36 will be described in detail. When the data set 35 detects a ringing voltage on the input telephone line 1 it produces a ring signal which is sent to the supervisor and register circuit 36. The circuit 36 initiates logic functions which result in a ready signal being sent back to the data set 35. The ready signal trips the ringing voltage and effectively answers the telephone in the data set 35. A ready signal is then sent to the circuit 36 which sets a 20 second master time out circuit that prevents one user from controlling the use of data set 35 for more than 20 seconds. When the ready signal is returned to the circuit 36, the circuit 36 issues a tone of one second duration which is routed back to the caller and provides an indication that the caller may go ahead with his communication. Next, the circuit 36 sends a mode signal to the data set 35 which results in removing the go ahead tone from the telephone line 1 and connecting the telephone line 1 to a tone decoding circuit in the data set 35. Also, at this time a four second timer is set so that if pager number tones are not received on the telephone line 1 within the 4 second interval the remote unit 20 will not process the communication. When this happens an invalid message recorder sends a message back to the calling party. If the communication is received within the allotted time, audio tones are detected, filtered and converted to an equivalent binary signal consisting of four data bits in the data set 35. Each binary digit is routed to the circuit 36 for temporary storage until the complete number is received. The supervisor and register circuit 36 may be modified to handle substantially any desired number of digits in the pager code. When the register in the circuit 36 is filled (a complete message is stored) an internal request signal is generated and routed to the scanner and control circuit 42, for reasons which will be described presently.

Figure 3:
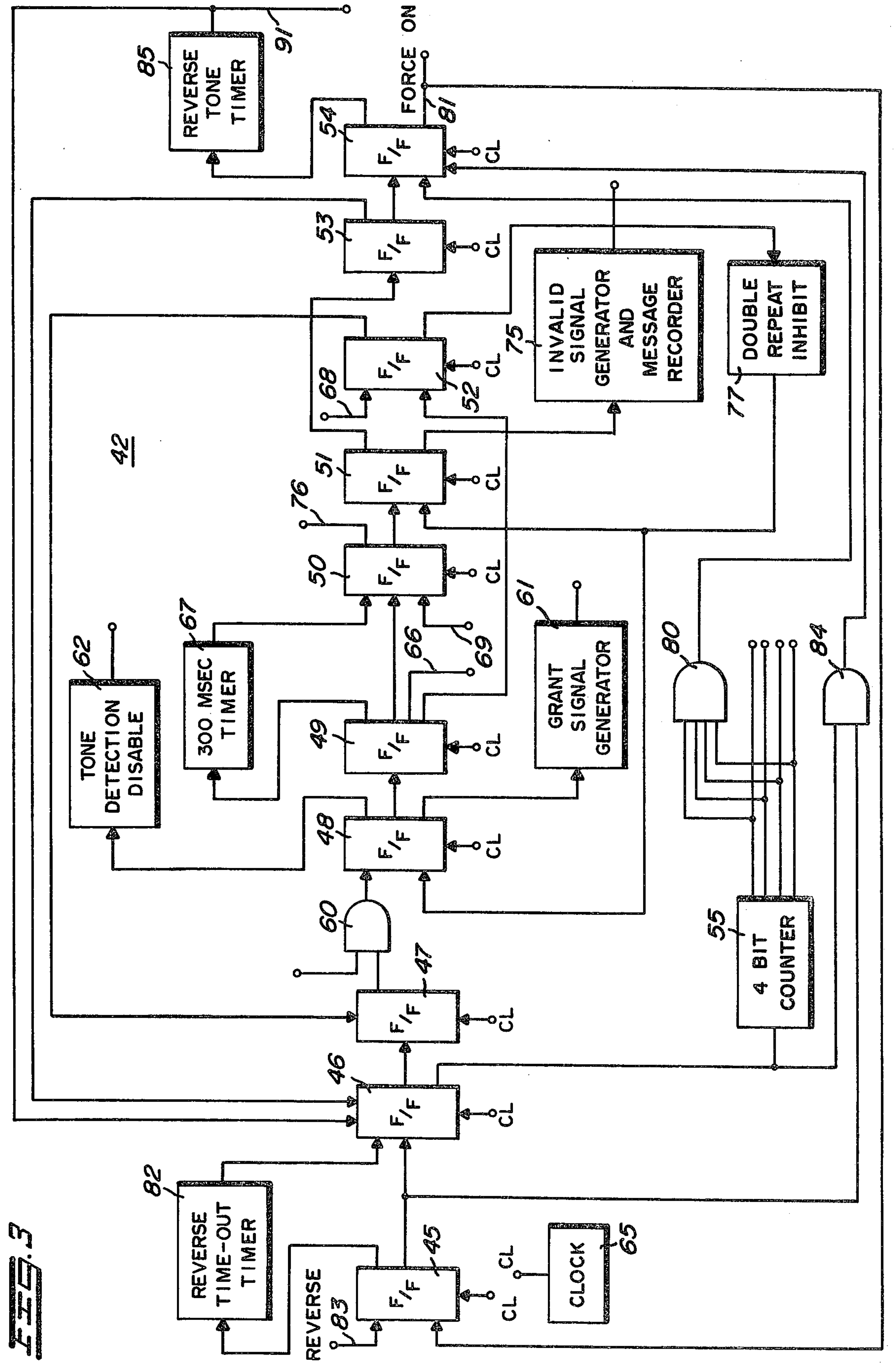
FIG. 3 is a block diagram of the scanner and control unit illustrated in block form in FIG. 2.

Referring to FIG. 3, a more detailed diagram of the scanner and control circuit 42 is illustrated. The scanner and control circuit 42 is primarily a switching circuit including 10 clocked flip-flops designated 45 through 54, respectively. In addition, the scanner and control circuit 42 includes a 4 bit counter 55 which is clocked by the output of the flip-flop 46 and provides 16 addresses or signals to the 16 supervisor and register circuits 36, 38, . . . 40. As an example of the operation of the circuit 42, when the counter 55 addresses the supervisor and register circuit 36, if the register is full (has a complete message stored therein) the request signal is transmitted from the circuit 36 to a gate 60. The request signal from the circuit 36 on the gate 60 is gated with the output of flip-flop 47 to set flip-flop 48. Flip-flop 48 then activates a grant signal generator 61 which supplies a signal back to the supervisor and register circuit 36 to permit the gating of the stored communication in the register thereof to the signal conditioner 41. At the same time a tone detector disable circuit 62 is energized and sends a signal to the remote communicator 43 to block detection of any tone control signals from the central terminal 22 until the communication from the circuit 36 is transmitted to the central terminal 22 for processing.

An internal oscillator or clock 65 is continuously supplying clock pulses to each of the ten flip-flops 45–54 on lines designated CL. Subsequent to the gating of the communication from the circuit 36 to the signal conditioner 41 (as described above), the next clock pulse from the clock 65 sets the flip-flop 49, which in turn issues a transmit signal on a line 66 to the remote communicator 43 and also sets a 300 millisecond timer 67 for detecting the presence of a repeat or valid control signal from the central terminal 22. A repeat signal from the central terminal 22 is coupled from the remote communicator 43 to the flip-flop 52 on a line 68. A valid signal from the central terminal 22 is coupled from the remote communicator 43 to the flip-flop 50 on a line 69. If neither a valid nor a repeat control signal is returned from the central terminal 22 within the 300 milliseconds, the last communication sent to the central terminal 22 for processing is considered to be invalid. At the end of the 300 millisecond period the timer 67 causes the flip-flop 50 to set flip-flop 51 and activate an invalid signal generator and message recorder 75 which supplies an invalid message through the circuit 36 and data set 35 to telephone line 1.

If a valid control signal is returned from the central terminal 22 within 300 milliseconds, flip-flop 50 is set and a valid command is issued on a line 76 to the supervisor and register circuit 36 which, in turn, sets a valid timer circuit and a high pitched interrupted tone is returned to the calling party for a specified period of time (for example, 2 seconds).

If a repeat control signal is returned from the central terminal 22 (caused by a parity error or the detection of some other error in the central terminal 22) the flip-flop 52 is set by the repeat signal on line 68 and a signal is sent back to the flip-flop 47 which causes the circuitry to retransmit the communication to the central terminal 22 in basically the same procedure as set forth above. If the repeated transmission also results in the reception of a repeat control signal from the central terminal 22, a double repeat inhibit circuit 77, which is connected to the output of the flip-flop 52, supplies an inhibit signal to the flip-flop 48 to prevent a second repeat of the transmission. A signal is also supplied from the inhibit circuit 77 to the flip-flop 51 to activate the invalid signal generator 75 and supply a message to the telephone line indicating that the message is invalid.

Once the communication is properly transmitted to the central terminal 22, or an invalid message has been transmitted to the caller on the input telephone line, flip-flop 53 is set and supplies a signal to flip-flop 46, which in turn supplies a signal to increment counter 55. Counter 55 than addresses the supervisor and register circuit 38, which is connected to input telephone line 2 through the data set 37, and if a complete message is stored in the register thereof a request signal is supplied to the gate 60. The above-described operation is continued sequentially until each of the lines 1 through 16 is tested and any messages stored in the registers attached thereto are transmitted to the central terminal 22. When the counter 55 indicates its highest count an AND gate 80 supplies a signal to set flip-flop 54 and supply a force-on signal on a line 81 through the remote communicator 43 to the central terminal 22. The output signal on the lead 81 is also supplied to set the flip-flop 45, which starts a reverse time out timer 82. An input lead 83 supplies a reverse tone from the central terminal 22, by way of the remote communicator 43, to the input of the flip-flop 45. If no reverse tone is present on the line 83 before the timer 82 times out, the flip-flop 46 is set and the counter 55 begins sequentially testing each of the input telephone lines as described above. If a reverse tone appears on the line 83 before the timer 82 sets flip-flop 46, output signals from the flip-flops 45 and 46 are supplied through a gate 84 to reset the flip-flop 54, and the reverse tone timer 85 is started. The reverse tone timer 85 supplies a signal to the flip-flop 46 which maintains the flip-flop 46 inactive for a specified period of time, in the present embodiment approximately 5 seconds. Thus, the reverse tone from the central terminal 22 deactivates the sequencing of the scanner and control circuit 42 for 5 seconds during which time the connecting telephone line 23 between the central terminal 22 and the remote unit 20 is reversed so that information can be sent from the central terminal 22 to the remote unit 20.

The central terminal 22 includes a transmitter control unit 90 which is coupled to the connecting line 23 when the reverse tone is sent from the central terminal 22. Similarly, a signal is sent from the reverse tone timer 85 on a line 91 to the remote communicator 43 which couples the transmitter 21 to the connecting line 23 so that the transmitter 21 can be controlled by the unit 90 at the central terminal 22. During the 5 seconds that the scanner and control circuit 42 is deactivated the transmitter control unit 90 controls the transmitter 21 to transmit all of the pages which have been stored in the central terminal 22 during the sequential coupling of the communications from the lines 1 through 16 to the connecting line 23. When the timer 85 times out the line 23 is again reversed so that information passes from the remote unit 20 to the central terminal 22 and the sequencing of the counter 55 and flip-flops 45–54 is again activated.

Thus, a multiplex system for paging terminals is disclosed wherein a plurality of input telephone lines are connected to a remote unit and the remote unit is coupled to a central terminal by a single telephone line. Further, the single telephone line is periodically used to convey pages from a transmitter control unit at the central terminal to a transmitter at the remote unit. Thus, the number of telephone lines connected between the remote unit and the central terminal is greatly reduced and the cost of the system is greatly reduced.

While we have shown and described a specific embodiment of this invention, further modifications and improvements will occur to those skilled in the art. We desire it to be understood, therefore, that this invention is not limited to the particular form shown and we intend in the appended claims to cover all modifications which do not depart from the spirit and scope of this invention.

We claim:

1. A multiplex system for paging terminals comprising:

a. a remote multiplex unit associated with a transmitter for communicating with portable pagers, said multiplex unit having a plurality of input telephone lines, each having data storage means associated therewith, and an output telephone line connected thereto, said multiplex unit further including switching means for sequentially sampling each of the data storage means associated with an input telephone line and connecting data storage means containing stored data to the output telephone line; and b. a central terminal connected to the output telephone line and including transmitter control means for controlling the transmitter in the remote multiplex unit to communicate with the portable pagers during the periodic coupling of the output telephone line to the transmitter.

2. A multiplex system for paging terminals as claimed in claim 1 including a plurality of remote multiplex units each associated with a transmitter and each adapted to have a plurality of input telephone lines and an output telephone line connected thereto.

3. A multiplex system for paging terminals as claimed in claim 1 wherein the multiplex unit further includes a register coupled to each of the input telephone lines for storing input communications until the output telephone line is coupled thereto.

4. A multiplex system for paging terminals as claimed in claim 1 wherein the switching means includes a plurality of clocked state flip-flops and a counter, said flip-flops and counter being connected for sequentially testing each input telephone line for a communication and switching to the next line in the absence of a communication, said flip-flops and counter being further connected for testing the central terminal for transmissions at the end of each sequence and switching into the next sequence in the absence of transmissions.

5. A method of connecting a remote unit, including a transmitter for communicating with portable pagers and having a plurality of input telephone lines connected thereto, to a central terminal, having transmitter control means, by a telephone line including the steps of:

a. storing input communications from each of said input telephone lines;

b. multiplexing the stored communications by sequentially switching the stored communications to the connecting telephone line for transmission to the central terminal; and c. periodically switching the connecting telephone line into communication with the transmitter control means and the transmitter for controlling the transmitter to transmit pages.

6. A method of connecting a remote unit, associated with a transmitter for communicating with portable pagers and having a plurality of input telephone lines connected thereto, to a central terminal, having transmitter control means, by a telephone line including the steps of:

a. storing input communications from each of said input telephone lines in a plurality of registers;

b. sequentially testing each register for a stored communication;

c. coupling the register being tested to the connecting telephone line for transmission of the communication to the central terminal when a complete communication is present therein and switching to the next register in the absence of a complete communication;

d. coupling the transmitter control to the transmitter through the connecting telephone line at the end of each sequence of testing the registers; and e. testing the transmitter control for communications and switching to the next sequence of testing of the registers in the absence of communications in the transmitter control.

7. A multiplex system for paging terminals as claimed in claim 1 wherein said multiplex unit further includes switching means for periodically coupling the output telephone line to the transmitter during the sequential sampling.

* * * * *